United States Patent [19]

Yano et al.

[11] Patent Number: 4,493,384
[45] Date of Patent: Jan. 15, 1985

[54] ELECTRONIC COUNTING SCALE

[75] Inventors: Shozo Yano, Kyoto; Akira Komoto, Shiga; Yasuhiro Fujinaga, Kyoto, all of Japan

[73] Assignee: Shimadzu Corporation, Kyoto, Japan

[21] Appl. No.: 479,338

[22] Filed: Mar. 28, 1983

[30] Foreign Application Priority Data

Mar. 31, 1982 [JP] Japan .................................. 57-54239
Mar. 31, 1982 [JP] Japan .................................. 57-54240
Mar. 31, 1982 [JP] Japan .................................. 57-54243

[51] Int. Cl.³ ...................... G01G 19/00; G01G 19/22
[52] U.S. Cl. ........................................ 177/25; 177/200
[58] Field of Search ............... 177/25, 200; 235/61 PS

[56] References Cited

U.S. PATENT DOCUMENTS 4,157,738  6/1979  Nishiguchi et al. ............ 177/200 X

FOREIGN PATENT DOCUMENTS 142419  11/1981  Japan .................................. 177/200
203922  12/1982  Japan .................................. 177/200

Primary Examiner—E. A. Goldberg
Assistant Examiner—Patrick W. Foster
Attorney, Agent, or Firm—Koda and Androlia

[57] ABSTRACT

There is disclosed an electronic counting scale provided with means for calculating a maximum addable number of items to be added to an already counted known number of items with an error being eliminated from the counted number of a total items including the added items, said means calculating the maximum addable number on the basis of the standard variation of an average weight estimated from the samples taken from the entire population of the items to be counted.

10 Claims, 3 Drawing Figures

ELECTRONIC COUNTING SCALE

FIELD OF THE INVENTION

The present invention relates to an electronic counting scale, namely an apparatus for counting the number of items from their weight, and more particularly to an electronic counting scale which adopts a method that unknown number of items are successively added to a known number of items first loaded on the scale.

BACKGROUND OF THE INVENTION

There has been disclosed in a Japanese Patent Publication No. 57-44128 an item counting system wherein a known number of items is first weighed to obtain a provisional average weight per item and, after any unknown number of items is added, the total weight is measured and then divided by the provisional average weight. The quotient of the division is rounded to the nearest integer to give the total number of items including the number of the added items. The total number thus obtained is used also to revise and increase the accuracy of the provisional average weight given previously. The total weight is divided by the total number to give a revised provisional average weight per item. This system, however, has a disadvantage that, if the number of the added items is too many, the quotient derived from the total weight divided by the provisional average weight may include an error which amounts to nearly an integer, resulting in giving an error of unity or larger to the total number obtained. In such a case any "rounding" operation on the quotient becomes nonsense as well as an investigation of the accuracy of the provisional average weight. Therefore, once an error is introduced in the total number, any of the thereafter following average-revising processes can not eliminate the counting error.

SUMMARY OF THE INVENTION

Accordingly, it is a principal object of the present invention to provide an electronic counting scale which calculates in advance to addition of items the number of items addable without generating an error, whereby a scale operator can add and count as many items as possible at one time within a limit free from a counting error. Another object of the present invention is to provide an electronic counting scale which informs a scale operator of an excessive addition of items by eliminating the numerical figures displayed on the number display or by displaying a specific mark, if the scale is loaded additively with items in excess of a maximum addable number. A further object of the present invention is to provide an electronic counting scale which calculates an error-free addable number of items according to a table or a function prepared beforehand on the basis of known information about the statistical weight distribution of the items to be counted.

The apparatus based on the present invention comprises a weighing tray to be loaded with items whose number is to be counted, a weight measuring means for measuring a gravitational force acting on said items loaded on said weighing tray and for outputting a digital weight value corresponding to said gravitational force, a central processing unit which includes an arithmetic organ for processing said digital weight value according to a predetermined program, a memory for storing various calculating formulae, various calculated values and said predetermined program, a number displaying means for displaying the number of said items calculated by said arithmetic organ, and an informing means for informing whether the number of items added on said weighing tray is equal to or exceeds the number calculated according to a predetermined form of calculation.

DETAILED DESCRIPTION OF THE EMBODIMENTS

Figure 1:
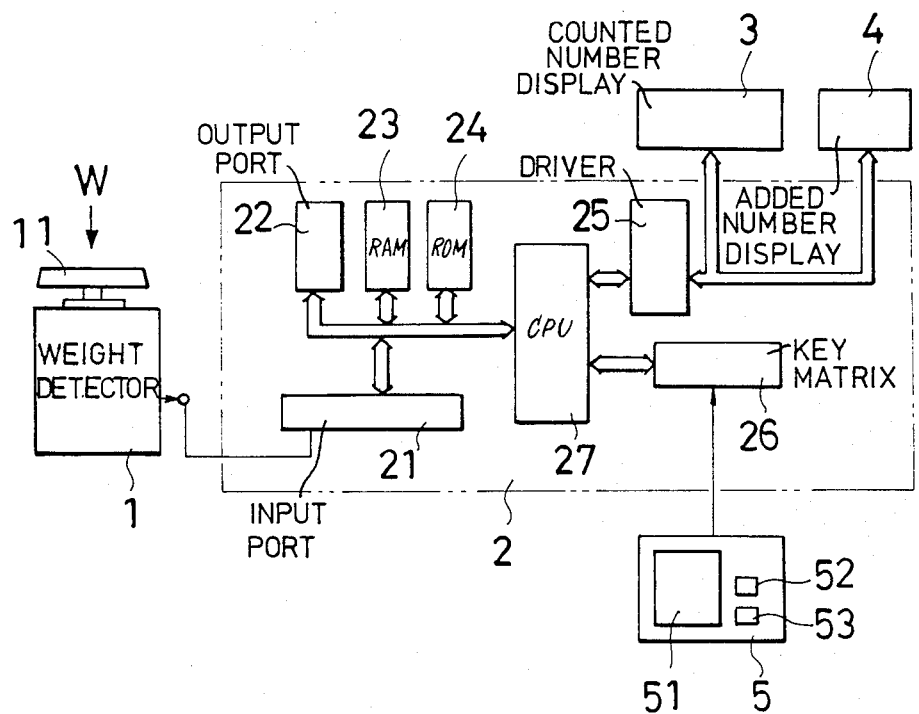
FIG. 1 is a block diagram showing the electric circuitry used in an embodiment of the present invention.

FIG. 1 is a block diagram showing the electric circuitry used in an embodiment of the present invention. A weight detector 1, comprising a load cell or a weight-and-electromagnetic force equilibrating unit, outputs at predetermined time intervals a digital weight data corresponding to the weight loaded on a weighing tray 11. A control unit 2 consists of a microcomputer which comprises an input port 21 for receiving measured data and set values, an output port 22 for outputting measured results, a RAM 23 for storing measured and calculated values, a ROM 24 for storing a program and arithmetic formulae, a driver 25 for a display unit 3, a key matrix 26 to which key signals are to be input from a key board 5, a CPU 27 to control the whole according to a below-described program. The RAM 23 contains data registers devised so as to accept and retain the successively input newer data by pushing out and disposing the previously retained older data. The display unit 3 displays the contents of the display registers A and B provided in the CPU 27. An informing means 4 informs a scale operator whether the number of added items coincides with or exceeds a calculated maximum addable number of items. The "maximum addable number" here means the maximum number of items addable without generating a counting error. The informing method is, for instance, by means of eliminating the displayed figures, displaying a specific mark or lighting a separately equipped informing lamp. The key board 5 contains not only figure keys but also a releasing key 52 for releasing the informing performance of the informing means 4 and a key 53 for inputting a coefficient of variation.

Figure 2:
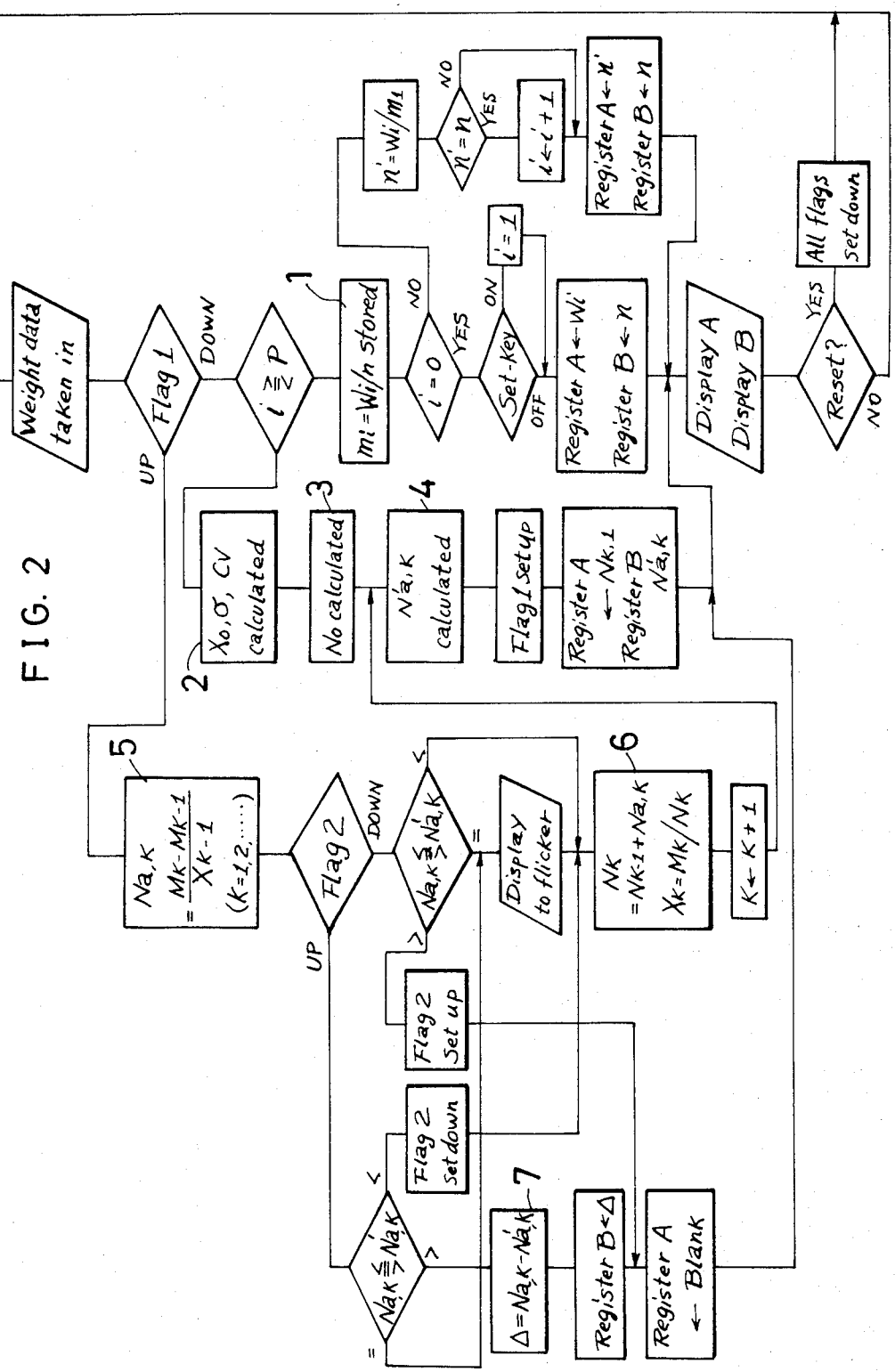
FIG. 2 is a flow chart showing the program of the embodiment.

FIG. 2 is a flow chart showing the contents of the program stored in the ROM 24. In the first place several samples each of which consists of the same number n of items are weighed to estimate the weight-scattering in the population. The number p of the samples is stored beforehand in the memory according to the program. The weight $W_i$ of each sample is divided by the number n of sample-constituent items to give the average weight $$m_i = W_i/n, \ (i=1, 2, \ldots, p) \tag{1}$$

of n items, and thus obtained p average weight values are stored in the memory at Step 1. Each time the weighing-and-averaging process is carried out on the p samples, the values n and $W_i$ are transferred to the registers A and B, respectively. After all of the p samples are weighed and averaged, the operational process is directed to Step 2. At Step 2 the average weight $X_0$ of the total $n \times p$ items (or the average of $m_i$), the standard deviation $\sigma$ and the coefficient of variation $C_v$ are calculated according to the following equations:

$$X_0 = \Sigma m_i / p \qquad (2)$$

$$\sigma = \sqrt{\frac{\Sigma m_i^2 - (\Sigma m_i)^2/p}{p-1}} \times \sqrt{n} \qquad (3)$$

$$C_v = \sigma / X_0 \qquad (4)$$

Step 2 is then followed by Step 3, where the total number of the items loaded on the scale at this stage of process is calculated as an "initial" total number $N_0$ according to the equation given below, (though the initial total number is, of course, known to be $n \times p$):

$$N_0 = \Sigma W_i / X_0 = M_0 / X_0 \qquad (5)$$

In the next place, at Step 4 the first maximum addable number $N'_{a,1}$ is calculated. The initial total number $N_0$ and the first maximum addable number $N'_{a,1}$ are transferred to the register A and the register B, respectively. The method of calculating the maximum addable number is as follows. The average weight of an already counted known number $N_{k-1}$ of items scattering in weight with a standard deviation $\sigma$ deviates by $3\sigma/\sqrt{N_{k-1}}$ from the true average weight of the entire population at a probability of 99.7%. In calculating, on the basis of $3\sigma/\sqrt{N_{k-1}}$, the number $N'_{a,k}$ of the items to be added to $N_{k-1}$, the average weight of the resultant total number $N_{k-1} + N'_{a,k}$ of items would deviate by $(3\sigma/\sqrt{N_{k-1}}) N'_{a,k}$ from the true average weight of the entire population, even if all the items to be added had the same weight as the average of the entire population. On the other hand, with the weight-scattering of the items to be added being taken into consideration, the resultant total average would deviate by $(3\sigma/\sqrt{N'_{a,k}}) N'_{a,k}$, even if the number $N_{k-1}$ of items had the same weight as the average of the entire population. In general both the deviation $(3\sigma/\sqrt{N_{k-1}}) N'_{a,k}$ and the deviation $(3\sigma/\sqrt{N'_{a,k}}) N'_{a,k}$ are encountered. Therefore, the following equation can be derived from the associative law of variance, provided that the scattering obeys the Gaussian distribution.

$$\left( \frac{3\sigma}{\sqrt{N_{k-1}}} N'_{a,k} \right)^2 + \left( \frac{3\sigma}{\sqrt{N'_{a,k}}} N'_{a,k} \right)^2 = \left( \frac{X_0}{2} \right)^2 \qquad (6)$$

$$(k = 1, 2, \ldots)$$

The factor $\frac{1}{2}$ in the parentheses on the right side is to keep a possible error not larger than 0.5, namely to eliminate a counting error which arises in rounding operation of the decimal figures appearing in the calculated values. By solving Eq. (6) with respect to $N'_{a,k}$, with Eq. (4) introduced, the number $N'_{a,k}$ is given by $$N'_{a,k} = \frac{1}{2} \left[ \sqrt{N_{k-1} \left\{ N_{k-1} + \left( \frac{1}{3C_v} \right)^2 \right\}} - N_{k-1} \right] \qquad (7)$$

$$(k = 1, 2, \ldots)$$

The number $N'_{a,k}$ obtained from Eq. (7) gives the abovementioned maximum addable number, namely the maximum number of items addable without generating a counting error. The number $N'_{a,1}$ is, of course, obtained from Eq. (7) by putting $k = 1$. After the first maximum addable number $N_{a,1}$ is obtained at Step 4, a flag 1 which shows the completion of the initial processing is set up to make the program proceed hereafter to Step 5, where an actually added number $N_{a,k}$ is calculated according to the equation:

$$N_{a,k} = (M_k - M_{k-1})/X_{k-1} \quad (k = 1, 2, \ldots) \qquad (8)$$

where $M_k$ is the total weight after the k-th addition of items and $X_k$ is the provisional average weight obtained from $M_k$ divided by $N_k$. Then it is judged whether the value of $N_{a,k}$ is equal to or smaller or larger than the value of $N'_{a,k}$ calculated according to Eq. (7). If $N_{a,k}$ does not exceeds $N'_{a,k}$, the program proceeds to Step 6, where the contents of the register storing $N_{a,k}$ and of the register storing the provisional average weight $X_k$ are revised as follows:

$$N_k \leftarrow N_{k-1} + N_{a,k} \qquad (9)$$

$$X_k \leftarrow M_k / N_k \qquad (10)$$

Particularly, if $N_{a,k}$ is just equal to $N'_{a,k}$, the display A informs it by several times flickering the numerical figures displayed thereon. The case of $N_{a,k}$ being larger than $N'_{a,k}$ is described later. Step 5 is then followed by Step 4 where the next value of $N'_{a,k}$ is calculated again with Eq. (7). The subsequent process is repeated through the above-described routine wherein the flag 1 is set up. In the routine, each time the items are added not in excess of $N'_{a,k}$ both the counted total number and the maximum addable number are increased.

On the other hand, if the items are added in excess of $N'_{a,k}$, a flag 2 which is named an over-flow flag is set up, and the excessive addition of items is informed, for instance, by displaying a predetermined blank sign instead of numerical figures on the display A. With the flag 2 being set up, the program flow is directed to Step 7, where the number $N_{a,k} - N'_{a,k}$ of items to be removed from the scale is calculated and displayed on the display B. The flag 2 is set down if a relation $N_{a,k} \leq N'_{a,k}$ is achieved by removing a certain number of items.

The method of calculating the maximum addable number $N'_{a,k}$ may be substituted by another one. In case, for instance, the number of items first sampled for estimating the weight-scattering of the population is small, the concept of the t-distribution may be introduced to increase the accuracy of the measurement. A constant t in the t-distribution is given by $$t = \frac{X - \mu}{\sigma / \sqrt{N}} \qquad (11)$$

where X is a calculated average, $\mu$ the true average of the population, $\sigma$ the standard deviation and N the number of items. The t-distribution is described in a standard textbook of statistics. On the other hand the degree of freedom $(p-1)$ is determined from the number p of sampling, and the constant t which gives a probability 95% at $p = 3$ is shown to be 4.303 in the table of t-distribution. It is shown from Eq. (11) that the true average value $\mu$ remains within $$\mu = X \pm t \frac{\sigma}{\sqrt{N}} \quad (12)$$

at the probability of 95%. For convenience of calculation, putting $$K = \pm t \frac{\sigma}{\sqrt{N}} \quad (13)$$

the maximum addable number $N'_b$ free from a counting error is obtained from $$N'_b = 0.4(X-K)/K \quad (14)$$

With respect to this method of calculation a flow chart is not shown herein.

Another embodiment of the present invention is described in the following. In this embodiment the coefficient of variation $C_v$ (or the standard deviation $\sigma$) is already known, and the maximum addable number $N'_{a,k}$ is calculated beforehand with $C_v$ used as a parameter, and stored in the memory in the form of a table or a function curve.

Figure 3:
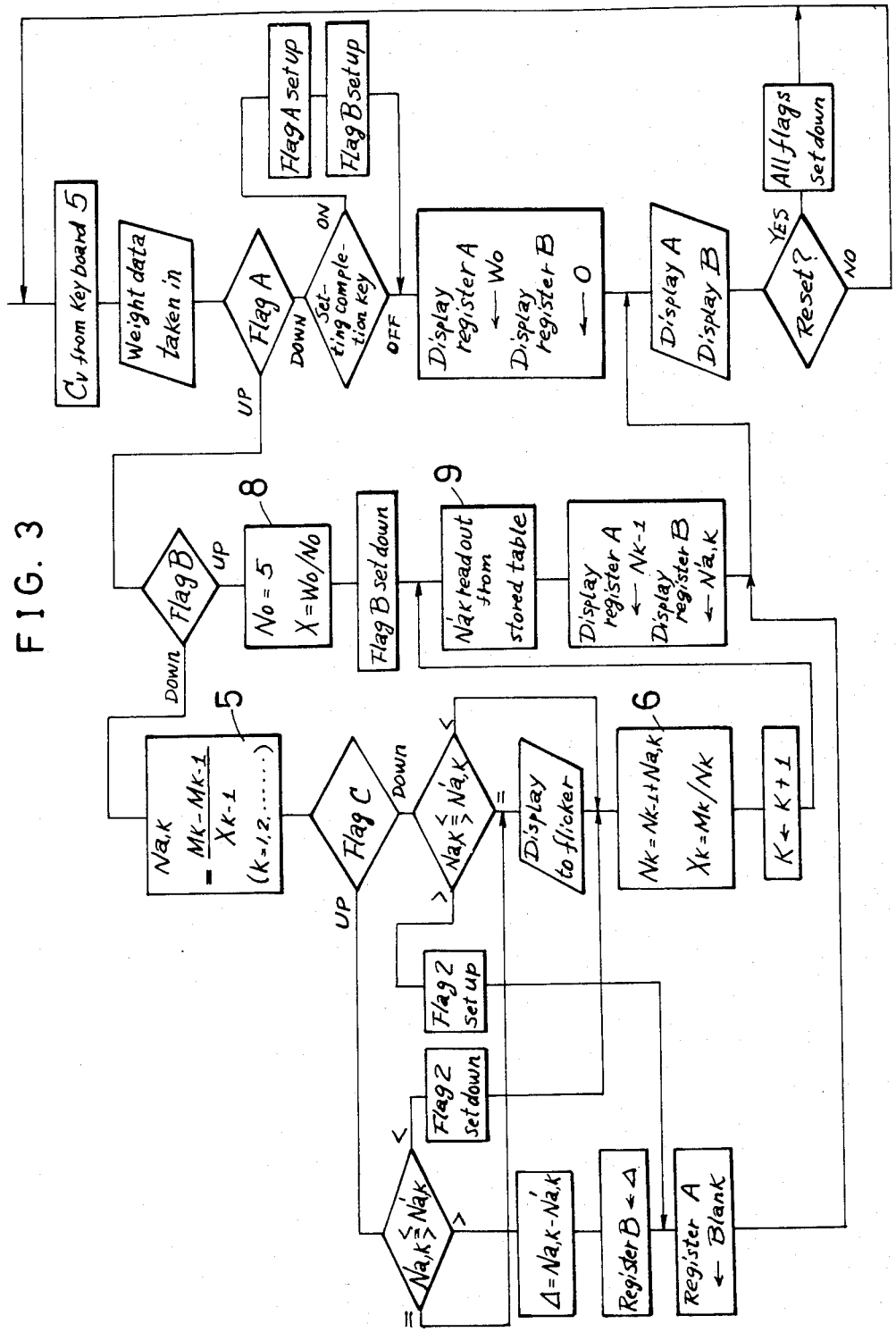
FIG. 3 is a flow chart showing the program of another embodiment of the present invention.

FIG. 3 shows a flow-chart in which a scale operator inputs $C_v$ through the key board 5 and operates a setting completion key 53 on the key board 5. With the setting completion key pushed, a flag A and a flag B are set up. As a result the program proceeds to Step 8, where an average X is calculated. In this embodiment the register stores N=5, because the number of items to be loaded in the first place is determined to be 5. After a calculation of X, the flag B is set down and Step 8 is followed by Step 9, where a maximum addable number $N'_{a,k}$ is read out from the function table stored previously in the memory. This table shows the maximum number $N'_{a,k}$ addable to the already known counted numbers $N_{k-1}$, with a coefficients of variation $C_v$ used as a parameter.

| $N_{k-1}$ | $N'_{a,k}$ $C_v$ | | | | | |
|---|---|---|---|---|---|---|
| | 0.002 | 0.003 | 0.005 | 0.01 | 0.02 | 0.03 |
| 5 ~ 15 | 180 | 120 | 70 | 35 | 16 | 10 |
| 16 ~ 50 | 300 | 200 | 120 | 56 | 26 | 15 |
| 51 ~ 100 | 550 | 360 | 210 | 94 | 40 | 21 |
| 101 ~ 300 | 760 | 500 | 280 | 120 | 46 | 24 |
| 301 up | 1300 | 840 | 450 | 170 | 58 | 26 |

With the flag B and a flag C set down, $N_{a,k} \gtrless N'_{a,k}$ is judged. The process of judgement is similar to that employed in the flow chart shown in FIG. 2, so the description is left out.

What is claimed is:

1. An electronic counting scale comprising a weighing tray to be loaded with items whose number is to be counted, a weight measuring means for measuring a gravitational force acting on said items loaded on said tray and for outputting a digital weight value corresponding to said gravitational force, a central processing unit which includes an arithmetic organ for processing said digital weight value according to a predetermined program, a memory for storing various calculating formulae, various calculated values and said predetermined program, said various calculating formulae containing a maximum number calculating formula which gives, in consideration of the weight fluctuations of the items to be counted, a maximum addable number rounded to the nearest whole number for fractions equal to or over 0.5 without giving a counting error, a number displaying means for displaying the number of said items calculated by said arithmetic organ, and an informing means for informing whether an unknown number of items added to an already counted known number of items is equal to or exceeds said maximum addable number calculated according to said maximum addable number calculating formula.

2. An electronic counting scale defined in claim 1, wherein said informing means eliminates the display on said number displaying means, if said unknown number of items added exceeds said maximum addable maximum number.

3. An electronic counting scale defined in claim 1, wherein said informing means flickers the display on said number displaying means, if said unknown number of items added coincides with said maximum addable number.

4. An electronic counting scale defined in claim 1, wherein a numerical figure displayer is provided which displays said maximum addable number.

5. An electronic counting scale defined in claim 1, wherein a numerical figure displayer is provided which displays the calculated number of actually added items.

6. An electronic counting scale defined in claim 1, wherein a numerical figure displayer is provided which displays the difference in number between said maximum addable number and the calculated number of actually added items if said informing means informs an addition of items in excess of said maximum addable number.

7. An electronic counting scale defined in claim 1, wherein if a calculated number of actually added items exceeds said maximum addable number, the display on said number displaying means is eliminated and then substituted by the difference in number between said calculated number of actually added items and said maximum addable number.

8. An electronic counting scale defined in claim 1, wherein whenever the number of actually added items is judged to exceed said maximum addable number, the following process of calculation is prohibited.

9. An electronic counting scale defined in claim 1, wherein said arithmetic organ mentioned in claim 1 calculates said maximum addable number $N'_{a,k}$ according to the equation $$N'_{a,k} = \frac{1}{2} [\sqrt{N_{k-1}\{N_{k-1} + (\overline{3C_v})^2\}} - N_{k-1}]$$

$(k = 1, 2, \ldots)$ where $N_{k-1}$ is a known counted number and $C_v$ is the coefficient of variation.

10. An electronic counting scale defined in claim 1, wherein said arithmetic organ calculates said maximum addable number $N'_b$ according to the following equation derived from a constant t in the t-distribution with a degree of freedom (p−1)

$$N'_b = \alpha(X-K)/X$$

where X is the average obtained from the weight measurements of a known number p of the samples, each of which consists of a known number N of items, $\sigma$ is the standard deviation, $\alpha$ is a constant regarding to the rounding operation on the numerical figure, and $K = \pm t\sigma/\sqrt{N}$.

* * * * *